E. GODDARD.

MANUFACTURE OF GLUE.

4072. REISSUED JUL. 12, 1870.

Witnesses.

J. Frank

John Geraghty

Inventor

E. Goddard

United States Patent Office.

THOMAS P. MILLIGAN AND THOMAS HIGGINS, OF BROOKLYN, NEW YORK, ASSIGNEES OF EMERSON GODDARD.

*Letters Patent No.* 44,528, *dated October* 4, 1864; *reissue No.* 4,072, *dated July* 12, 1870.

IMPROVEMENT IN THE MANUFACTURE OF GLUE.

The Schedule referred to in these Letters Patent and making part of the same.

*To all whom it may concern:*

Be it known that I, EMERSON GODDARD, of the city, county, and State of New York, have invented a new and useful article of manufacture, which I denominate Instantaneous or Comminuted Glue; and that the following is a clear, full, and exact description of the same, and of the method of producing it which I prefer, reference being had to the accompanying drawing, in which—

Previous to my invention the glue of commerce has been found in the market in the form of hard, angular flakes, and a considerable time was consumed by artisans in the preparation of this glue of commerce for use in their various manufactures, first in soaking it in cold water, and afterward in heating the glue in a hot-water bath until the flakes were dissolved. I have, by my invention, endeavored to save to the artisan the time heretofore required in such preparation by reducing the time required for the proper dissolving of glue to less than five minutes, which process has formerly required some hours to do it properly, and also to greatly diminish the chance of bad glue-joints from the use of imperfectly-dissolved glue, so likely to occur with hasty and impatient mechanics. Moreover, all the various articles of dry glue and gelatine heretofore in use are, in a great measure, unfitted for domestic use by reason of the long period of time consumed in their proper preparation for adhesive and for dietetic purposes. A great inconvenience has also been heretofore experienced by the merchant in the retailing of the ordinary glue of commerce from the great difficulty with which small packages can be made up, (and by hand only,) by reason of the cutting of the wrapping by the sharp angular corners and edges of the broken flakes of glue, causing much waste of time and stock.

My invention or new manufacture consists of glue, comminuted to small particles of practically uniform size, as distinguished from the glue in angular flakes hitherto known. This new manufacture is free from all the above objections to common glue, as it does not require to be prepared for solution by soaking, is quickly permeated by water, so that it can be dissolved in large quantities, ready for mechanical use, in less than five minutes, and in small quantities, for domestic use, in less than one minute, and can be put up by machinery or by hand into packages of uniform size, and of regular form and weight, similar to those in which ground spices and other like articles are put up (or papered and boxed) for domestic use, and to be sold by retail merchants.

My invention is, moreover, superior to the glue of commerce, heretofore in use, in that it has an appearance more pleasing to the eye, and a comminuted glue of the same grade as a common glue has a whiter apparent color, and is therefore more merchantable, and will bring a higher price than the latter.

Figure 1:
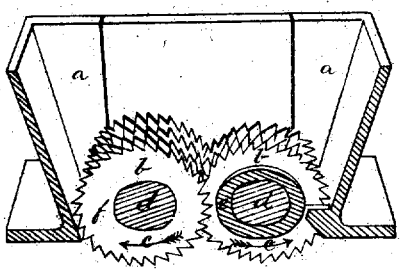
Figure 1 represents a perspective section of a breaking-mill, employed by me in the production of my new manufacture.

The best process which I have devised for making such instantaneous glue and the apparatus or machinery I use in the said manufacture, is as follows:

Fig. 1 is a vertical perspective section, showing one-half of what I call a breaking-machine. It consists of a hopper, *a a*, into which is mounted two saw-toothed rolls, running in the direction indicated by the arrows *c c*, and being mounted in the frame of said hopper *a a*, in suitable bearings, and driven by power-pulleys, gears, or other suitable mechanism.

Figure 2:
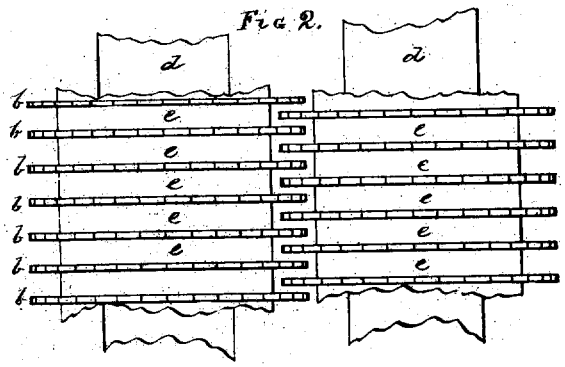
Figure 2 represents a plan of portions of the breaking-rolls thereof.

Fig. 2 is a plan of a section of these saw-toothed rolls, *b b* being rings of saw-teeth, *d* the axis on which they are mounted, *e e* blank rings between the saws, and about twice as thick as the rings of teeth, the saw of one roll running opposite the blank of the other roll alternately throughout.

*f f* are rows of pins on either side of the hopper *a a*, meshing in between the saws to prevent the contents of the hopper from falling out of the openings that would otherwise be formed by the spaces between the saws, and also to prevent the saws from fouling with any matter that might otherwise be retained between the saws during their revolution. Into the hopper of this machine I put the ordinary glue of commerce, and, by the rotation of the toothed-saw rolls, comminute the glue into small, quite uniform grains about half the size of barleycorns.

Figure 3:
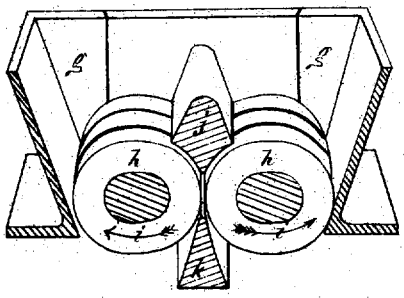
Figure 3 represents a perspective section of the finishing-mill employed by me, and Figure 4, a plan of portions of the finishing-rolls thereof.

The coarse stock thus prepared I then subject to the action of a rasping or grating-machine, shown in the vertical perspective section at fig. 3. This machine consists of a hopper, *g g*, in the lower part of which run the two rasping-rolls *h h*, in the direction indicated by the arrows *i i*, being impelled by appropriate mechanism. Above the rolls, and a little distance therefrom, is a stationary guide-bar, *j*, and the previously broken glue-stock being placed in the hopper, is, by rotation of the rasping-rolls, brought under the said guide-bar, to be acted upon by the teeth of the rasping-rolls. To retain this glue-stock under the guide-bar until it is fully worked, another bar, *k*, which I call a stop-bar, is placed beneath the rolls and between the same. The glue-stock is retained between the two bars until it is comminuted to the proper degree, when it passes off between the stop-bar *k* and the rolls to a receptacle placed beneath the machine.

Figure 4:
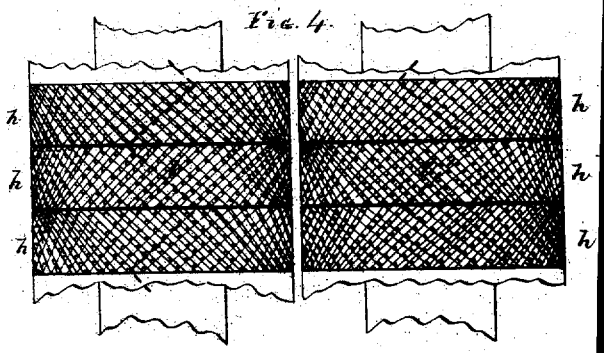

Fig. 4 shows a plan of a section of the rasping-rolls *h h*, with the position and form of the teeth or rasp surfaces, by which the comminuting is done. Each roll is divided into sections of about an inch in length. On the periphery in each section are rows of teeth, *l l*, about six or eight to the inch of length, and the rows about four to the inch of circumference. The rows run at an angle of about 45° with the axis of the rolls, and the teeth are cut at right angles with their rolls, or 45° with the axis of the rolls, in the opposite direction to the rows. Every other section of these rolls has its teeth cut to right or left, contrary to the adjoining sections, so as to give the full row of the teeth a zigzag position on the surface of the complete roll, said zigzag position being shown in fig. 4.

The object sought to be attained in placing the rows of teeth at opposite angles is to mass the glue-stock in sections or small bodies, so as that it can be wholly comminuted without long-continued contact with the teeth at any given point, and to thereby avoid heating the glue, and also to keep all parts in a constant equalizing motion to supply the discharge, and to further prevent heating.

The object attained by placing the teeth *l l* at so great an angle is to cause the glue, as reduced, to slide off the teeth without adhering thereto, and consequently gumming up the machine, and also to enable the teeth to more thoroughly fracture all the particles of glue while in the act of taking them from the mass of glue-stock in the hopper.

When it is required to run the machines at a high rate of speed, the stock may be intermixed with a portion of rye-flour, starch, or any other substance which will, in a measure, prevent heat, and also serve to adulterate and cheapen the product without materially destroying the good qualities of the glue for the purpose of its intended use.

Having thus described my invention, and the mode of producing it which I have employed with success, I declare that I am aware that gelatine has been reduced to long, thin shreds, and therefore do not intend to include such shred-like material in my invention, which differs from it in being in the condition of loose particles or grains in place of long shreds. I do not also claim the mechanical means or process by which my new article of manufacture is produced, as it is obvious that other means and process of crushing or reduction may be used to manufacture my new articles out of common dry-flake glue or gelatine by a crushing or breaking operation; but

What I claim as my invention, and desire to secure by Letters Patent, is—

The comminuted glue hereinbefore described, as a new article of manufacture.

Witness my hand this 21st day of June, A. D. 1870.

E. GODDARD.

Witnesses:

J. S. GRANT,

JOHN GERAGHTY.